United States Patent
Lee et al.

(10) Patent No.: US 10,129,815 B2
(45) Date of Patent: *Nov. 13, 2018

(54) METHOD AND SYSTEM FOR EFFICIENT MANAGEMENT OF A COMMUNICATION SYSTEM

(71) Applicant: AT&T Mobility II LLC, Atlanta, GA (US)

(72) Inventors: Bo Lee, Alpharetta, GA (US); Arthur Brisebois, Cumming, GA (US); Adrianne Luu, Roswell, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/694,204

(22) Filed: Sep. 1, 2017

(65) Prior Publication Data
US 2018/0007613 A1    Jan. 4, 2018

Related U.S. Application Data

(63) Continuation of application No. 14/085,781, filed on Nov. 20, 2013, now Pat. No. 9,781,655.

(51) Int. Cl.
*H04W 40/34* (2009.01)
*H04L 12/721* (2013.01)
*H04L 29/06* (2006.01)

(52) U.S. Cl.
CPC .......... *H04W 40/34* (2013.01); *H04L 45/12* (2013.01); *H04L 65/1069* (2013.01); *H04L 65/608* (2013.01)

(58) Field of Classification Search
CPC ....... H04L 45/12; H04L 45/02; H04L 45/123; H04L 45/124; H04L 64/608; H04W 40/34
See application file for complete search history.

(56) References Cited

U.S. PATENT DOCUMENTS 7,206,582 B2  4/2007  Tom et al.
7,720,021 B1  5/2010  Mohan et al.
(Continued)

FOREIGN PATENT DOCUMENTS

WO    2007041963    4/2007

OTHER PUBLICATIONS

Gluhak, Alexander et al., "Multicast bearer selection in heterogeneous wireless networks." Communications, 2005. ICC 2005. 2005 IEEE International Conference on. vol. 2. IEEE, 2005.
(Continued)

*Primary Examiner* — Benjamin H Elliott, IV
*Assistant Examiner* — Brian P Cox
(74) *Attorney, Agent, or Firm* — Guntin & Gust, PLC; Atanu Das

(57) ABSTRACT

A method that incorporates the subject disclosure may include, for example, identifying, by a network device comprising a processor, a bearer path through a communication network for carrying internet protocol packets associated with a calling session between a first mobile device and a second mobile device and activating, by the network device, a bridging bearer path at a nearest network element to generate a direct tunnel for carrying the internet protocol packets associated with the calling session and to modify the bearer path to a shortest bearer path, where the nearest network element comprises a network element that is communicatively coupled to both the first mobile device and the second mobile device and that is closest to the first mobile device and the second mobile device. Other embodiments are disclosed.

20 Claims, 5 Drawing Sheets

(56) References Cited

U.S. PATENT DOCUMENTS

| | | |
|---|---|---|
| 7,818,450 B2 | 10/2010 | Chen et al. |
| 8,009,554 B2 | 8/2011 | Chin et al. |
| 8,401,029 B2 | 3/2013 | Luo et al. |
| 8,495,226 B2 | 7/2013 | Lau |
| 2010/0039987 A1 | 2/2010 | Hegde et al. |
| 2010/0061328 A1 | 3/2010 | Walldeen et al. |
| 2011/0039540 A1 | 2/2011 | Mouly et al. |
| 2011/0264909 A1 | 10/2011 | Ejzak |
| 2012/0039262 A1 | 2/2012 | Walsh |
| 2013/0010785 A1 | 1/2013 | Mandi |
| 2013/0091526 A1 | 4/2013 | Iyer et al. |
| 2013/0287012 A1 | 10/2013 | Pragada et al. |
| 2014/0112306 A1 | 4/2014 | Zhou et al. |
| 2015/0045041 A1 | 2/2015 | Polisetty et al. |
| 2015/0245397 A1 | 8/2015 | Sachs et al. |

OTHER PUBLICATIONS

Lim, Jaewon et al., "Local Traffic Offloading for Communication Between UES", U.S. Appl. No. 61/570,267, filed Dec. 13, 2011, 1-9.

400

100# METHOD AND SYSTEM FOR EFFICIENT MANAGEMENT OF A COMMUNICATION SYSTEM

CROSS REFERENCE TO RELATED APPLICATIONS

This application is a Continuation of and claims priority to U.S. application Ser. No. 14/085,781, filed Nov. 20, 2013. The contents of the foregoing are hereby incorporated by reference into this application as if set forth herein in full.

FIELD OF THE DISCLOSURE

The subject disclosure relates to a method and system for efficient management of a communication system.

BACKGROUND

Communication systems, such as a mobile communications system, can be used for providing various services, including voice, video and/or data services, and user location information can be important for next generation IP multi-media services provided by telecommunication systems As the number of users and their service requirements increase, the load on the network increases. Infrastructure expansion and improvement can lessen the network load but is costly.

BRIEF DESCRIPTION OF THE DRAWINGS

Reference will now be made to the accompanying drawings, which are not necessarily drawn to scale, and wherein.

DETAILED DESCRIPTION

Figure 1:
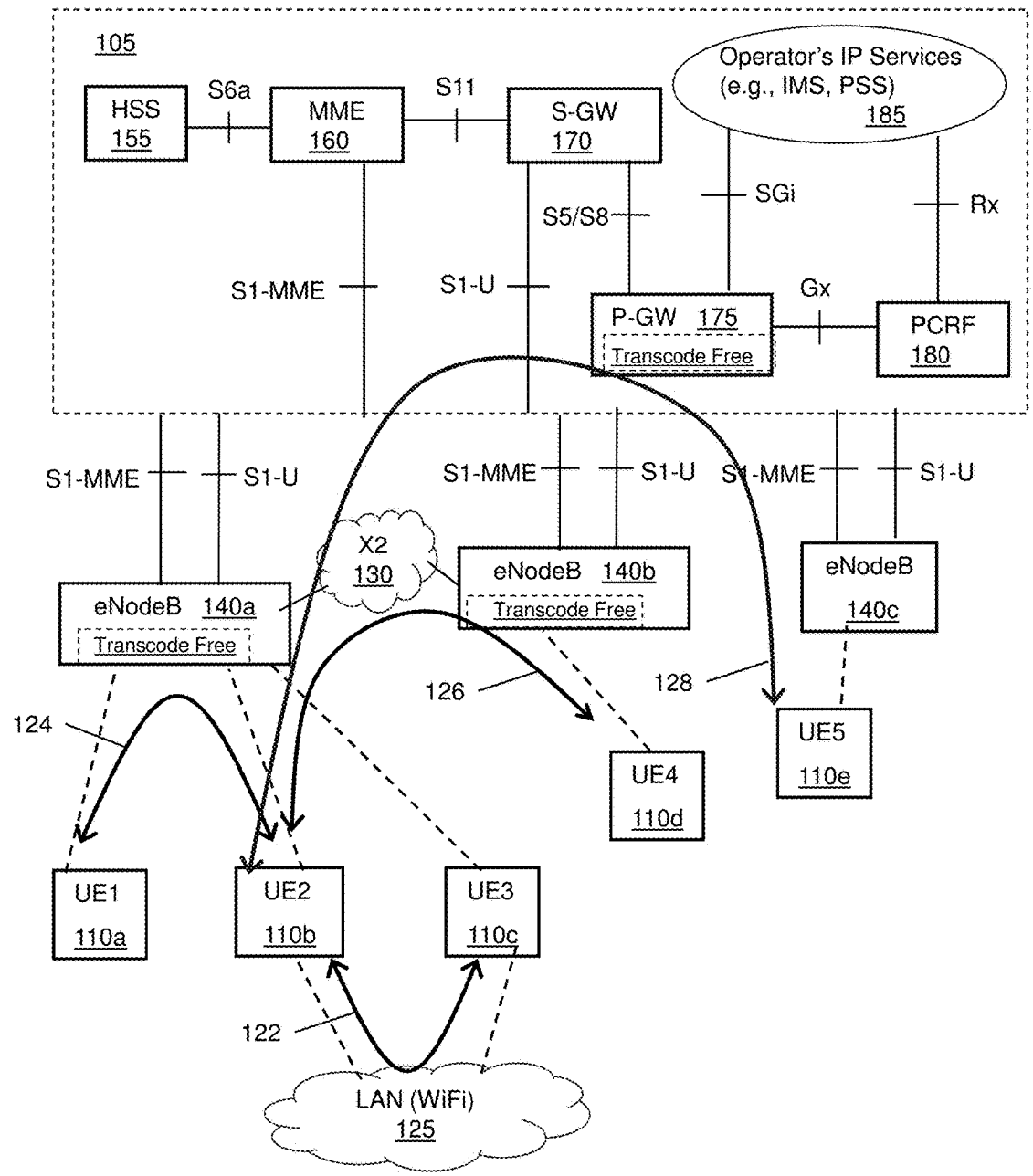
FIG. 1 depicts an illustrative embodiment of a cellular system for providing shortest bearer paths for carrying internet protocol packets during calling sessions.

The subject disclosure describes, among other things, illustrative embodiments of a method and system for providing shortest bearer paths for carrying internet protocol packets during calling sessions. The exemplary embodiments can be used to manage network routing options for User Equipment (UE), or mobile communication devices operating at a Long Term Evolution (LTE) network. The method can be useful for efficient management and routing of voice-over-internet protocol (VoIP) calls on an LTE communication network, also called voice-over-LTE (VoLTE). The method also be useful for routing non-voice data packets between end-user devices, such as video data associated with video calling sessions.

In the general solution for VoLTE, the LTE communication network must select and manage a real-time transport protocol (RTP) bearer path to carry IP data packets between two mobile devices engaged a VoLTE calling session. The data packets for the calling session generally must be routed via a network element that hosts a transcoder pool. This network element is typically high up in the hierarchy of the LTE network, well above the hierarchical level of the mobile devices. Therefore, even in cases when the two mobile devices that are engaging in the calling session are physically next to each other, the RTP bearer path for the IP data packets can be relatively long. As a result, users of the communication system experience longer delay to hear the other party. Also, network resources are required to support the entire RTP bearer path, which reduces the operating efficiency of the system, while increasing demand on network resources. By shortening the RTP bearer path, user experiences can improve, while operator capital expenditure and operation expense can be reduced.

One embodiment of the subject disclosure is a mobility management entity device, comprising a processor; and a memory that stores executable instructions that, when executed by the processor, can facilitate performance of operations, including receiving a calling message indicating a calling session between a first mobile device and a second mobile device. The executable instructions can also facilitate performance of operations for retrieving first network information associated with the first mobile device and second network information associated with the second mobile device according to the calling message. The executable instructions can further facilitate performance of operations for identifying a bearer path through a communication network for carrying internet protocol packets associated with the calling session according to the first network information and the second network information. The executable instructions can also facilitate performance of operations for determining whether the calling session qualifies for bearer path shortening according to the first network information and the second network information, where the shortening reduces a number of required elements in the bearer path. The executable instructions can further facilitate performance of operations for determining a network element that is communicatively coupled to both the first mobile device and the second mobile device and that is closest to the first mobile device and the second mobile device to identify a nearest network element according to the calling session qualifying for bearer path shortening. The executable instructions can facilitate performance of operations for determining if nearest network element comprises a bridging bearer path and, in turn, for activating the bridging bearer path to generate a direct tunnel for carrying the internet protocol packets associated with the calling session and to modify the bearer path to a shortest bearer path.

One embodiment of the subject disclosure includes a machine-readable storage medium, comprising executable instructions that, when executed by a processor, facilitate performance of operations, comprising identifying a bearer path through a communication network for carrying internet protocol packets associated with a calling session between a first mobile device and a second mobile device. The executable instructions can facilitate performance of operations for determining whether the calling session qualifies for bearer path shortening according to network information associated with the first mobile device and the second mobile device. The executable instructions can facilitate performance of operations for identifying a network element that is communicatively coupled to both the first mobile device and the second mobile device and that is closest to the first mobile device and the second mobile device to identify a nearest network element according to the calling session qualifying for bearer path shortening. The executable instructions can facilitate performance of operations for activating a bridging bearer path at the nearest network element to generate a direct tunnel at the nearest network element for carrying the internet protocol packets associated with the calling session and to modify the bearer path to a shortest bearer path.

One embodiment of the subject disclosure can include a method, comprising identifying, by a network device comprising a processor, a bearer path through a communication network for carrying internet protocol packets associated with a calling session between a first mobile device and a second mobile device and activating, by the network device, a bridging bearer path at a nearest network element to generate a direct tunnel for carrying the internet protocol packets associated with the calling session and to modify the bearer path to a shortest bearer path, wherein the nearest network element comprises a network element that is communicatively coupled to both the first mobile device and the second mobile device and that is closest to the first mobile device and the second mobile device.

FIG. 1 depicts an illustrative embodiment of a system 100 for providing shortest bearer paths for carrying internet protocol packets during calling sessions. The system 100 provides shortest RTP bearer paths for calling sessions over an LTE network, such as, VoLTE to VoLTE calls. By selecting and activating shortest RTP bearer paths, delay times can be reduced to thereby reduce "mouth-to-ear" latency for mobile users during VoLTE to VoLTE calls. In addition, selection and usage of the shortest RTP bearer path also improves VoLTE network overall resource efficiency.

In FIG. 1, a mobile communication system 100 is illustrated that can provide communication services, including voice, video and/or data services to mobile devices, such mobile communication devices, or end user devices 110a-e. System 100 can enable communication services over a number of different networks, such as between end user devices (UE1-UE5) 110a-e. The end user devices 110a-e can be a number of different types of devices that are capable of voice, video and/or data communications, including a mobile device (e.g., a smartphone), a personal computer, a set top box, and so forth. In one or more embodiments, the end user devices 110a-e can be smart mobile communication devices that can include cellular transceivers for communicating with a cellular system, such as a Long-Term Evolution (LTE) system 105. The end user devices 110a-e can also include short distance wireless transceivers, such as Wi-Fi transmitters, for communicating with a wireless local area network (LAN) 125.

System 100 can include a primary Long-Term Evolution (LTE) Radio Access Technology (RAT) network, such as E-UTRAN, for providing wireless connectivity to eNodeB nodes 140a-b. E-UTRAN can utilize a number of interfaces including Iu, Uu, Iub and/or Iur. The system 100 can also include one or more secondary RAT networks, such as a Universal Mobile Telecommunications System (UMTS), a Global System for Communications (GSM) network, Evolution Data Only (EVDO) network, or a Code Division Multiple Access (CDMA) network. In one or more embodiments, UMTS can facilitate communications between base stations (e.g., Ater and Abis interfaces) and base station controllers (e.g., A interfaces). The system 100 can use the second RAT networks for accessing the core LTE network 105 directly, while bypassing the eNodeB devices 140a-b.

The system 100 can implement a fallback method whereby, if the primary RAT/eNodeB access is down or impaired, then the system 100 can fall back to allowing system access via the secondary RAT capabilities.

The system 100 can further include a Mobility Management Entity (MME) 160. Other components not shown can also be utilized for providing communication services to end user devices 110a-e, such as a Mobile Switching Center (MSC) which can facilitate routing voice calls and Short-Message Service (SMS), as well as other services (e.g., conference calls, FAX and circuit switched data) via setting up and releasing end-to-end connections, handling mobility and hand-over requirements during the communications, and/or performing charging and real time pre-paid account monitoring.

In one or more embodiments, E-UTRAN can be the air interface for an LTE upgrade path for mobile networks according to the 3GPP specification. E-UTRAN can include one or more eNodeB nodes 140a-b on the network that are connected to each other such as via X2 interfaces 130 and which are further connectable to the packet-switch core network 105 via an S1 interface. For example, E-UTRAN can use various communication techniques including orthogonal frequency-division multiplexing (01-DM), multiple-input multiple-output (MIMO) antenna technology depending on the capabilities of the terminal, and beam forming for downlink to support more users, higher data rates and lower processing power required on each handset.

In one or more embodiments, a Home Subscriber Server (HSS) 155 can be provided that is a central database that contains user-related and subscription-related information. The functions of the HSS 155 include functionalities such as mobility management, call and session establishment support, user authentication and access authorization. In one embodiment, the HSS 155 can manage subscription-related information in real time, for multi-access and multi-domain offerings in an all-IP environment. The HSS 155 can be based on Home Location Register (HLR) and Authentication Center (AuC).

In one or more embodiments, MME 160 can perform the function of a control-node. For example, the MME 160 can perform functions such as idle mode tracking and paging procedure including retransmissions. The MME 160 can also choose a serving gateway for the end user device 110a such as at the initial attach and at time of intra-LTE handover involving node relocation. MME 160 and HHS 155 can be accessed when the end-user device 110a attempts to re-register to user E-UTRAN 120 to access the core network 105.

In one or more embodiments, a Serving Gateway (S-GW) 170 can route and forward user data packets, while also acting as the mobility anchored for the user plane during inter-eNodeB node 140a-b handovers and as the anchored gateway for mobility between LTE and other 3GPP technologies (e.g., terminating S4 interface and relaying the traffic between 2G/3G systems and P-GW 175). For idle state UEs 110a, the S-GW 170 can terminate the downlink data path and can trigger paging when downlink data arrives for the UE 110a. The S-GW 170 can manage and can store UE 110a contexts, e.g. parameters of the IP bearer service, network internal routing information.

In one or more embodiments, a PDN Gateway (P-GW) 175 can provide connectivity from a UE 110a to external packet data networks by being the point of exit and entry of traffic for the UE 110a. UE 110a can have simultaneous connectivity with more than one P-GW 175 for accessing multiple PDNs. The P-GW 175 can perform policy enforcement, packet filtering for each user, charging support, lawful interception and/or packet screening. The P-GW 175 can also act as the anchored device for mobility between 3GPP and non-3GPP technologies such as WiMAX and 3GPP2 (CDMA 1× and EvDO).

In one or more embodiments, a Policy Control Resource Function (PCRF) 180 can be provided. For example, the PCRF 180 can be a software node designated in real-time to determine policy rules. As a policy tool, the PCRF 180 can operate at the network core and can access subscriber databases and other specialized functions, such as a charging system, in a centralized manner. The PCRF 180 can aggregate information to and from the network, operational support systems, and other sources (such as portals) in real time, supporting the creation of rules and then automatically making policy decisions for each subscriber active on the network. The PCRF 180 can provide a network agnostic solution (e.g., wire line and/or wireless) and can be integrated with different platforms like billing, rating, charging, and subscriber database or can also be deployed as a standalone entity. The functions performed by the PCRF 180 can be any variety of functions, such as computer implemented steps in a process or algorithm associated with operation of a mobile communications network.

In one or more embodiments, system 100 can enable smart mobile devices (UE1-UE5) 110*a-e* that include multiple technologies (e.g., cellular transceivers and Wi-Fi transceivers) to engage in calling sessions, where a shortest bearer path can be provided carrying internet protocol packets between end user devices 110*a-e*. The exemplary embodiments can be used to manage network routing options for end user devices 110*a-e* and can be useful for efficient management and routing of voice-over-internet protocol (VoIP) calls.

In one or more embodiments, the method targets calling sessions between user devices 110*a-e*, where the calling sessions can be voice-over-LTE (VoLTE). The calling sessions can involve user devices 110*a-e* that are members of one MME group service area. That is, both the calling and the called parties can be using user devices 110*a-e* that are serviced by a single MME 160. In one or more embodiments, the user devices 110*a-e* have GPS or location functions and can also determine or estimate its speed of motion.

In one or more embodiments, a calling end user device 110*a* can send a calling message to the MME 160 to alert the MME 160 that a calling session has been requested with a called device 110*b*. For example, a calling end user device 110*a* can send a session invitation protocol (SIP) INVITE message to the communication system 100. The SIP INVITE can be forwarded to the MME 160 by the eNodeB 140*a*. The MME 160 can analyze the calling message to determine the identities of the calling user device 140*a* and the called user device 140*b*.

In one or more embodiments, the MME 160 can retrieve network information associated with the calling and called end user devices 110*a-b*. The MME 160 can determine which whether both devices 110*a-b* are part of a group that is serviced by the MME 160. Alternatively, the MME 160 can determine whether both devices 110*a-b* are part of the same service area for the P-GW 175. In one embodiment, this is the minimum requirement for the method to select and enable the shortest RTP bearer path. In another embodiment, the MME 160 can verify that the both of the end user devices 110*a-b* are registered to the service provider of the communication system 100 as a prerequisite for using the shortest RTP bearer path. In another embodiment, the MME 160 can determine from the network information that both of the end user devices 110*a-b* are intended or are likely to remain in the same MME group and/or P-GW group. If both devices 110*a-b* are not in the same MME group and/or P-GW group, are not going to remain in the same MME group and/or P-GW group, or are not registered to the same service provider, then the MME 160 can process the call session such that the typical RTP bearer path is used. However, if these limitations are met, then the MME 160 can take advantage of the signal processing proximity of the two end user devices 110*a-b* to shorten the RTP bearer path.

In one or more embodiments, the MME160 can determine if the calling and called devices 110*a-b* each support a common voice coder-decoder (CODEC). By supporting a common voice CODEC, the end-user devices 110*a-b* can communicate directly, through a transcoder free bridge via, for example, an eNobeB node 140*a* in a shortened bearer path. If the devices 110*a-b* do not share a common voice CODEC, then it is necessary to route the voice data from each of the devices 110*a-b* through the entire, typical network path to transcoders. The network transcoders can translate/convert the divergent voice data rates to create a common standard. For example, if the calling and called devices 110*a-b* do not share a common voice CODEC, then their bearer paths may have to carry the signals to the Operator's IP Services 185 to access a transcoder. By contrast, if the two devices 110*a-b* share a common voice CODEC, then the bearer paths can be shortened substantially, perhaps only extending as far as the eNodeB node 140*a* that services the two devices 110*a-b*.

In one or more embodiments, the MME 160 can determine if the end-user devices 110*a-b* are stationary or moving. Mobility information can be exchanged during the set-up for the call session. In one embodiment, each end-user device 110*a* can track its position according to GPS information and determine if the device 110*a* is in motion or is stationary. The device 110*a* can, for example, compare location information, over time, to determine if the device 110*a* is moving and, if so, then to further determine a rate of movement. In one embodiment, the end-user device 110*a* can compare a rate of movement against a threshold of movement rate to determine if the movement is consequential. For example, the end-user device 110*a* can move about in a narrow or area, such as if the caller was walking around in a relatively small area. In that case, the end-user device 110*a* can determine that the movement is not sufficiently large so as to cause any changes to the routing of the call—such as moving from an area covered by a first eNodeB 140*a* to an area covered by a second eNodeB 140*b*. In another example, the end-user device 140*a* can determine that the device 140*a* is moving through larger area or at a faster rate and might well leave a first eNodeB 140*a* to an area covered by a second eNodeB 140*b*. In other embodiments, end-user devices 110*a* can use other methods for determining movement, such as kinetic energy signals at the device 110*a* and/or changes in signal strength. In one embodiment, the MME 160 can use information regarding the movement and/or stationary nature of end-user devices 110*a-b* engaged in a calling session to conclude if these devices are moving and, if so, then if this movement is significant. If the MME 160 determines that the movement is significant, then the MME 160 can determine that shortest path routing will not be available for this calling session.

In one or more embodiments, the MME 160 can first determine the normal, or default, RTP bearer path, without shortening. In the event that the MME 160 is unable to determine a shortened pathway, then this default RTP path can be used for carrying the IP data packets.

In one or more embodiments, the MME 160 can determine a nearest network element that can support a shortest RTP bearer path, one that is shorter than the default bearer path. To determine the nearest element, the MME 160 can use the network information for the calling and called end user devices 110a-b to first determine all of the network elements that are communicatively coupled to each of these end user devices 110a-b. For example, where the calling and called devices are UE1 110a and UE2 110b, these end user devices share network elements eNodeB 140a, S-GW 170, and P-GW 175. The network element closest to the two calling session devices 110a-b is eNodeB 140a, while the network element that is farthest away, in terms of the signal path, is P-GW 175. In another example, where UE2 110b and UE3 110c are the calling session devices, then the MME 160 can determine that the both devices are commonly coupled to network elements eNodeB 140a, S-GW 170, and P-GW 175, plus the wireless local area network (LAN) 125. In this case, the nearest network element can be either the eNodeB node 140a or the wireless LAN 125. However, since the wireless LAN 125 can be utilized to transmit data between the UE2 110b and UE3 110c without use of other system resources, the MME 160 can prefer the wireless LAN 125 as the nearest network element.

In another example, where UE2 110b and UE4 110d are the calling devices, the MME 160 can determine from network information that the two devices do not share eNodeB nodes. Rather, UE2 110b is served by eNodeB 140a while UE4 110d is served by eNodeB 140b. In this case, the commonly coupled elements appear to be S-GW 170 and P-GW 175. However, MME 160 can also determine the X2 interface 130 can serve as a commonly coupled network element since it is coupled to each end user device 110b and 110 d via the eNodeB nodes 140a-b. The X2 interface is the nearest network element. In yet another example, UE2 110b can engage in a calling session with UE5 110e. In this case the nearest network elements are S-GW 170 and P-GW 175, since the serving eNodeB nodes 140a and 140c do not share an X2 interface.

In one or more embodiments, the MME 160 can further require that the nearest network element also include a function for bridging across the network element without the need for a transcoding process. By eliminating a transcoding process, the shortened RTP bearer path reduces the processing complexity while increasing speed and throughput. Returning to the prior examples, where UE1 110a enters into a calling session with UE2 110b, the MME 160 can determine that the eNodeB node 140a is the nearest network element to the two devices. Further, the MME 160 can determine that the eNodeB node 140a includes a bridging function to route the IP data packets from each of the end user devices 110a and 110b to the other of the end user devices 110a and 110b. Therefore, the MME 160 can conclude that the eNobeB node 140a is the nearest network element with a bridging function and can be used for enabling the shortest RTP bearer pathway 124 for the calling session including devices 110a and 110b. Similarly, the MME 160 can determine that the nearest network device with bridging capability for a calling session, between UE2 110b and UE4 110d, is the X2 interface between the eNodeB node 140a and the eNodeB node 140b. Enabling the X2 interface will activate a shortest RTP bearer path 126. In one or more embodiments, transcoder-free operation can improve voice quality while using fewer network resources and elements.

For a calling session between UE2 110b and UE3 110c, the nearest network element can be identified by the MME 160 as the wireless LAN 125, which can serve as a bridging function to activate a shortest RTP bearer path 122. Where the calling session comprises UE4 110d and UE5 110e, then the nearest network element is S-GW 170. However, S-GW 170 does not include a bridging function. Therefore, the MME 160 can determine that the nearest network element for the UE4 110d and UE5 110e is actually P-GW 175, which has a transcode free bridging function. Activation of the bridging function in P-GW 175 can cause a shortest RTP bearer path 128.

In one or more embodiments, after the MME 160 has determined the shortest RTP bearer path for a pair for devices 110a-e engaged in a common caller session, then the MME 160 can notify network elements, such eNodeB 140a-c, the wireless LAN 125, S-GW 170, P-GW 175. The MME 160 can also notify end user devices 110a-e. In addition to notification, the MME 160 can direct the configuration of network elements to cause the shortest RTP bearer path to become activated while freeing up other network resources that would be required to maintain the default RTP bearer path. In one or more embodiments, the network elements that are bypassed, due to the activation of the shortest RTP bearer path, can be directed to release resources previously allocated to supporting either or both of the calling end user devices 110a-b. These resources can be reallocated to other uses that can further speed up the communication system.

In one or more embodiments, where the MME 160 enables a shortest RTP bearer over the wireless LAN 125, the MME 160 can coordinate and/or direct the wireless LAN 125 to establish a direct tunnel between the UE2 110b and UE3 110c devices using the bridging function. As a result, the two mobile devices 110b-c can exchange adaptive multi-rate (AMR) packets via the direct tunnel provided by the LAN 125. The two mobile devices 110b-110c can, in turn, exchange SIP messages to establish the media for the calling session (i.e, voice bearer). The two mobile devices 110b-c can continue to send regular SIP messages to the network 105, with an appropriate indication that no resources are demanded from the network 105, as in a normal VoLTE, so that the signaling process can be completed in the network 105.

In one or more embodiments, where the MME 160 enables a shortest RTP bearer over the eNodeB node 140a for end user devices 110a-b, then the MME 160 can coordinate and/or direct the eNodeB node 140a to establish a direct tunnel between the UE1 110a and UE2 110b devices using the bridging function. As a result, modification in messages can be directed by the MME 160 to avoid using any resources in the transcode controller and the GTP. For example, the MME 160 can direct changes to the AAR, RAR, and RAA messages that are associated with the P-CSCF, the PCRF 180, and the P-GW 175, the Create Bearer Request and Create Bearer Response associated with the P-GW 175, the S-GW 170, and the MME 160, the S1 E-RAB Setup Request, S1 E-RAB Setup Response, and S1 UL NAS associated with the S1 interface, and the Transport RRC Connection Reconfiguration Complete and RRC UL Info Transfer message. In one or more embodiments, the MME 160 can direct the transmission of the RRC Connection Reconfiguration message to the calling and called mobile devices 110b-c, separately, to invoke radio bearer set ups. The eNodeB node 140a "bridges" the radio bearers for the two mobile devices 110b-c so the media tunnel is established. The two mobile devices 110b-c can then exchange AMR packets via the dedicated tunnel.

In one or more embodiments, where the MME 160 enables the shortest RTP bearer path using the X2 interface between eNodeB nodes 140a and 140b, then the MME 160 can coordinate and/or direct the X2 interface to establish a direct tunnel between the UE2 110b and UE4 110c devices. As a result, modification in messages can be directed by the MME 160 to avoid using any resources in the transcode controller and the GTP. For example, the MME 160 can direct changes to the AAR, RAR, and RAA messages that are associated with the P-CSCF, the PCRF 180, and the P-GW 175, the Create Bearer Request and Create Bearer Response associated with the P-GW 175, the S-GW 170, and the MME 160, the S1 E-RAB Setup Request, S1 E-RAB Setup Response, and S1 UL NAS associated with the S1 interface, and the Transport RRC Connection Reconfiguration Complete and RRC UL Info Transfer message. In one or more embodiments, the MME 160 can direct the transmission of the RRC Connection Reconfiguration message to the calling and called mobile devices 110b and 110d, separately, to invoke radio bearer set ups. The two eNodeB nodes 140a and 140b need to have functions to "bridge" the X2 interface between the two eNodeB nodes 140a and 140b and the radio bearers for the two call session devices 110b and 110d, so the media tunnel is established. The two mobile devices 110b and 110d can then exchange AMR packets via the dedicated tunnel.

In one or more embodiments, where the MME 160 enables the shortest RTP bearer path over the GTP at the P-GW 175, then the MME 160 can coordinate and/or direct the X2 interface to establish a direct tunnel between the UE2 110b and UE4 110c devices. As a result, modification in messages can be directed by the MME 160 to avoid using at least some of the resources in the transcode controller and the GTP. For example, the MME 160 can direct changes to the AAR, RAR, and RAA messages that are associated with the P-CSCF, the PCRF 180, and the P-GW 175. The MME 160 can establish two, dedicated EPS bearers, one for the calling device 110b and one for the called device 110e. The P-GW 175 needs to have a function to "bridge" the X2 interface between the calling session devices 110b and 110e so that the media tunnel is established. The two mobile devices 110b and 110e can then exchange AMR packets via the dedicated tunnel.

In one or more embodiments, a wireless local area network (LAN) 125 can be present at a service. The LAN 125 can be designed to provide wireless access to the Internet 135 for devices 110a-e that can be coupled to the LAN 125. For example, the LAN 125 can be located at a public place, such as shopping mall, a college campus, a large church, an airport, a commercial location, or a sporting venue. In one embodiment, the LAN 125 can provide access freely to devices 110a-e with or without authenticating access. For example, the LAN 125 can require that each device 110a-e enter a name and/or password to authorize access. In one embodiment, access to the LAN 125 can be limited to devices 110a and/or subscribers associated with the LTE network 105. The LTE service provider can provide and/or partner with a provider to make sure that wireless LAN capability is available to its subscribers and/or subscribed devices 110a-e at specific locations. In another embodiment, access to the LAN 125 can be protected via a machine code or identifier or by a digital certificate. This approach can provide limited access to LAN 125 to protect the bandwidth of the LAN 125 while not inconveniencing a user of an end user device 110a with a need to enter authenticating information when activating a connection to the LAN 125. In another embodiment, the LAN 125 can be open for access to any wireless device without a protective password. For example, a public building can offer free, wireless access to the Internet 135 via a wireless LAN 125 as an enticement for people to visit.

In one or more embodiments, end user devices 110b-c can be coupled to the wireless LAN 125 and to the cellular network 105. During normal operation, an end user device 110a will normally be connected to the cellular network 105 to which the device 110a is subscribed, assuming that the cellular network 105 is available at the location.

In one or more embodiments, the cellular network can determine a location for each device 110a. For example, the device 110a can report a location based on an on-board global positioning system (GPS) function. The cellular network 105 can determine if the end user device 110a is located in an area with good coverage from the wireless LAN 125 and the cellular network E-UTRAN 120. Generally, the end user device 110a should not only have excellent coverage and signal strength but should be able to maintain these levels if the end user device 110a is moved a nominal distance.

In one or more embodiments, the cellular network 105 can determine if the end user device 110a is moving and, if moving, then it can further determine a direction and speed of movement. For example, the end user device 110a can report a series of locations and timestamps to the cellular network 105. The locations and timestamps can be converted into movement information. Alternatively, the end user device 110a can convert location information directly into movement information and report the movement information to the cellular network 105.

In one or more embodiments, the MME 160 can alter a shortest bearer path routing after this routing has been established for a calling session. For example, during a calling session, the MME 160 can determine that one of the end-user devices 110a has moved during the call. The MME 160 can detect this movement via, for example, reporting of location information from the end-user device 110a during the session. In another example, the MME 160 can determine that a device 110a has moved based on changes in signal strength or based on a device 110a moving out of an eNobeB area. In one embodiment, the MME 160 can detect a change in performance of an element in the shortest bearer path. For example, a bridging communication link that is used to connect the data paths of the end-user devices 110a-b can malfunction and/or exhibit reliability issues. The MME 16 can detect these changes and/or unexpected aspects in performance and re-route the shortest bearer path to the best available shortest bearer path that removes of mitigates the problematic connection.

In one or more embodiments, the MME 160 can access a "T" function at a signal path device to allow for bridging of calling sessions involving multiple end-user calling devices 110a-e. The function can allow for conference calling and for monitoring (CALEA) of the conference call using shortest bearer path routing a point of the core network.

Figure 2:
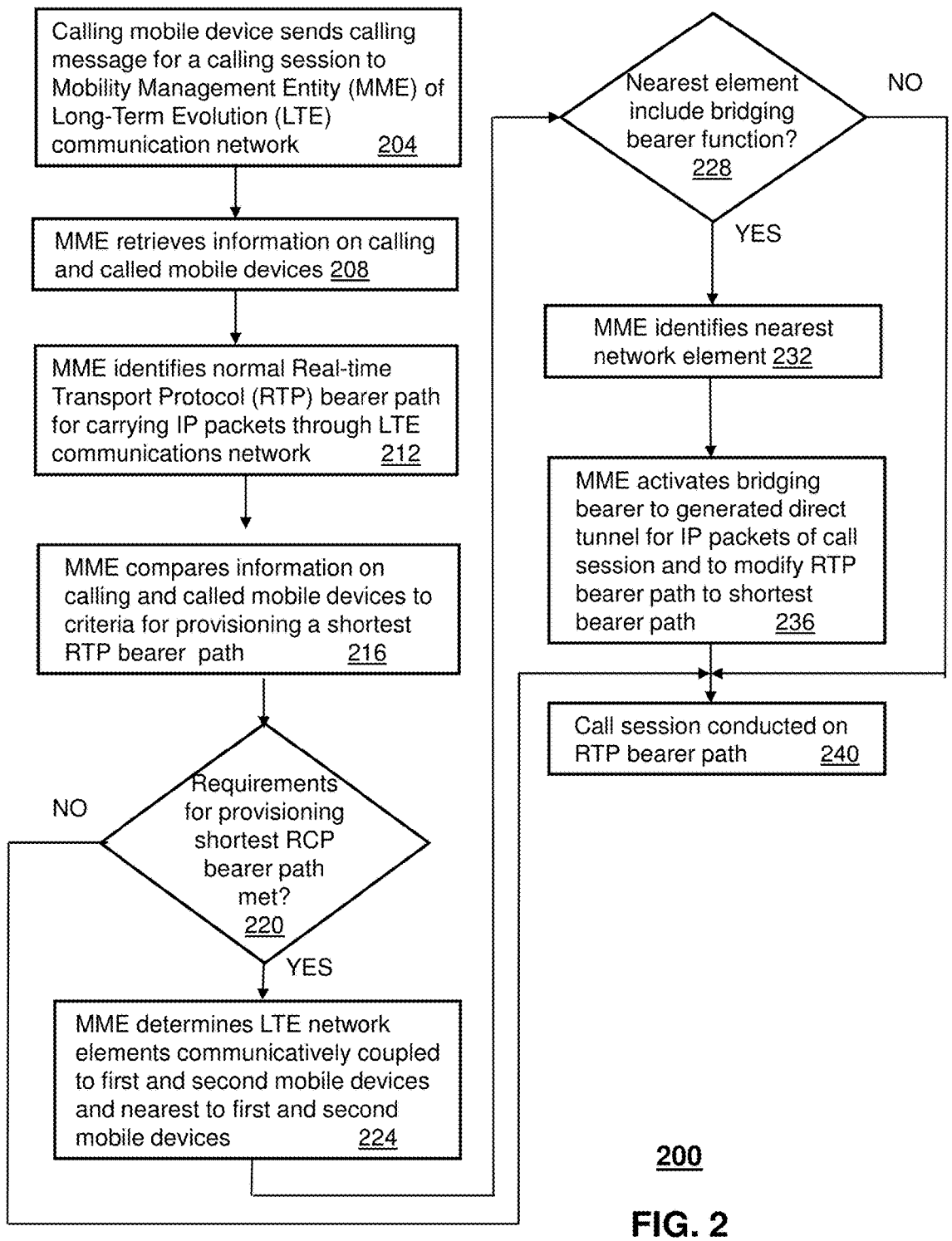
FIG. 2 depicts an illustrative embodiment of a method for providing shortest bearer paths for carrying internet protocol packets during calling sessions.

FIG. 2 depicts an illustrative embodiment of a method for providing shortest bearer paths for carrying internet protocol packets during calling sessions. Method 200 can begin at 204, where a calling mobile device, such as UE1 110a, sends calling message for a calling session involving the calling device 110a and a called device, such as UE2 110b, to a MME 160 of a Long-Term Evolution (LTE) communication network. In step 208, the MME 160 can retrieve information on calling and called mobile devices 110a-b.

In step 212, the MME 160 can identify a "normal" Real-time Transport Protocol (RTP) bearer path for carrying IP packets through LTE communications network. In step 216, the MME 160 can compare information on calling and called mobile devices 110a-b to criteria for provisioning of shortest RTP bearer path. In one or more embodiments, the MME 160 can retrieve network information associated with the calling and called end user devices 110a-b. The MME 160 can determine which whether both devices 110a-b are part of a group that is serviced by the MME 160. Alternatively, the MME 160 can determine whether both devices 110a-b are part of the same service area for the P-GW 175. In one embodiment, this is the minimum requirement for the method to select and enable the shortest RTP bearer path. In another embodiment, the MME 160 can verify that the both of the end user devices 110a-b are registered to the service provider of the communication system 100 as a prerequisite for using the shortest RTP bearer path. In another embodiment, the MME 160 can determine from the network information that both of the end user devices 110a-b are intended or are likely to remain in the same MME group and/or P-GW group. In step 220, the MME 160 can determine if the requirements for the provisioning of a shortest RTP bearer path have been met and, if met, then, in step 224, the MME 160 can determine LTE network elements 140a, 170, 175 that are communicatively coupled to the first and second mobile devices 110a-b and nearest to the first and second mobile devices 110a-b. In one or more embodiments, transcoder-free operation can improve voice quality while using fewer network resources and elements In one or more embodiments, the MME 160 can determine a nearest network element that can support a shortest RTP bearer path, one that is shorter than the default bearer path. To determine the nearest element, the MME 160 can use the network information for the calling and called end user devices 110a-b to first determine all of the network elements that are communicatively coupled to each of these end user devices 110a-b.

In step 228, the MME 160 can determine the nearest network element 140a of the communicatively coupled network elements 140, 170, 175, where the nearest network element also contains a bridging bearer function. In one or more embodiments, the MME 160 can further require that the nearest network element also include a function for bridging across the network element without the need for a transcoding process. By eliminating a transcoding process, the shortened RTP bearer path reduces the processing complexity while increasing speed and throughput. In step 232, the MME 160 can identify a nearest network element 140a and, once identified, then in step 236, the MME 160 can activate the bridging bearer to generate a direct tunnel for IP packets of call session and to modify the RTP bearer path to the shortest RTP bearer path 124. In step 240, the call session between the two end user devices 110a-b is conducted using an RTP bearer path.

Figure 3:
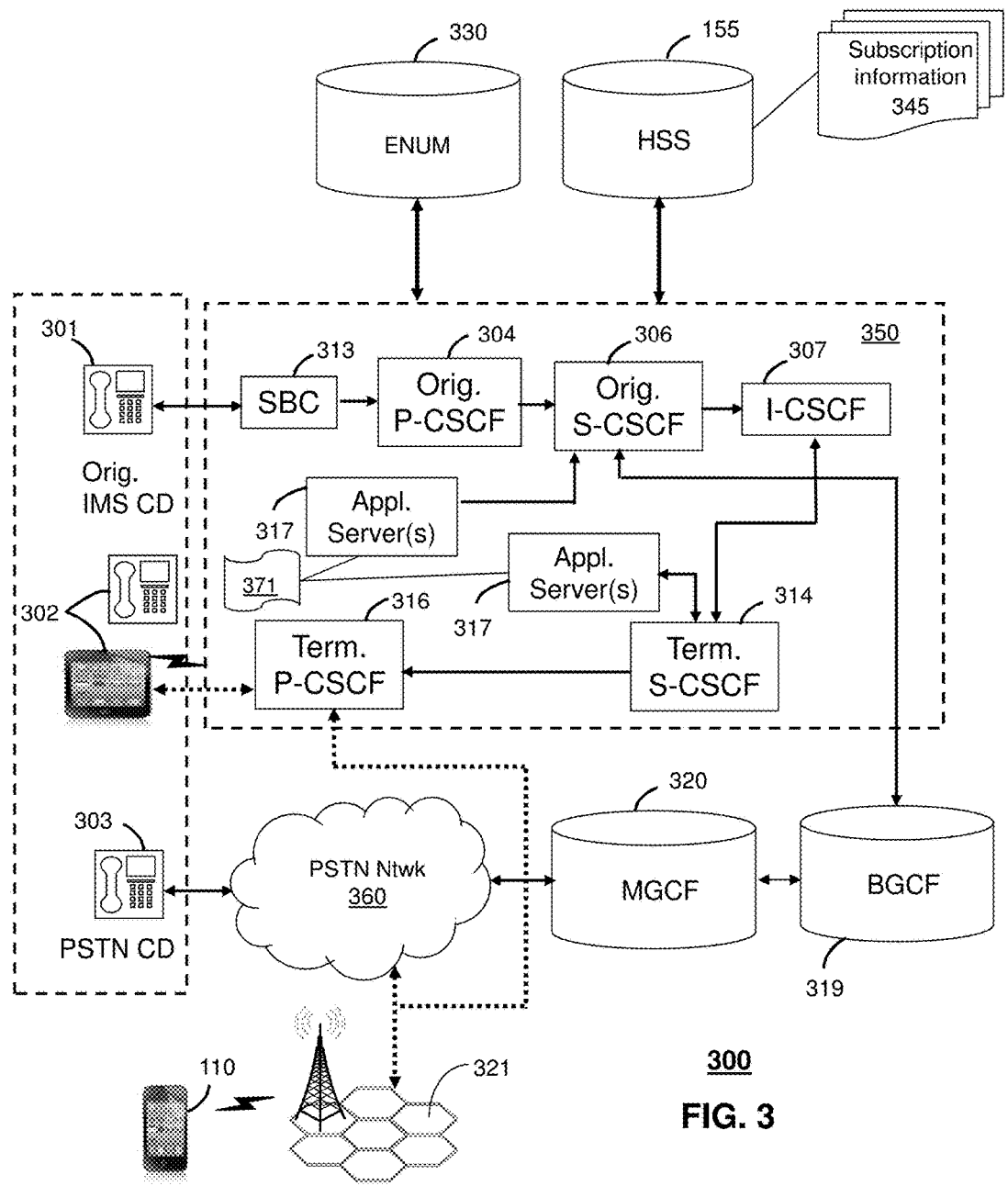
FIG. 3 depicts an illustrative embodiment of the cellular system for providing shortest bearer paths for carrying internet protocol packets during calling sessions.

FIG. 3 depicts an illustrative embodiment of the cellular system for accessing additional communication resources and using these resources to share network resources between multiple mobile devices. Communication system 300 can be overlaid or operably coupled with systems 100 of FIG. 1 as another representative embodiment of communication system 100. System 300 allows for selecting an anchored device 110a that can route, though the wireless and cellular interfaces of the anchored device 110a, cellular communications for user devices 110b-d and the cellular network 105.

Communication system 300 can comprise a Home Subscriber Server (HSS) 340, a tElephone NUmber Mapping (ENUM) server 330, and other network elements of an IMS network 350. The HSS 155 can receive subscription information 345, such as from PCRF 180 of FIG. 1). The subscription information 345 can be stored and used for a session event reporting registration process for subscribing devices (e.g., application servers 317 selectively requesting ULI). In one embodiment, the HSS 155 can report ULI, such as by querying PCRF, which will report upon detection of session events identified in subscription information while not reporting other ULI for session events that are not identified in subscription events.

The IMS network 350 can establish communications between IMS-compliant communication devices (CDs) 301, 302, Public Switched Telephone Network (PSTN) CDs 303, 305, and combinations thereof by way of a Media Gateway Control Function (MGCF) 320 coupled to a PSTN network 360. The MGCF 320 need not be used when a communication session involves IMS CD to IMS CD communications. A communication session involving at least one PSTN CD may utilize the MGCF 320.

IMS CDs 301, 302 can register with the IMS network 350 by contacting a Proxy Call Session Control Function (P-CSCF), through a Session Border Controller (SBC), which communicates with an interrogating CSCF (I-CSCF), which in turn, communicates with a Serving CSCF (S-CSCF) to register the CDs with the HSS 155. To initiate a communication session between CDs, an originating IMS CD 301 can submit a Session Initiation Protocol (SIP INVITE) message to the SBC 313. The SBC 313 can forward the SIP INVITE to an originating P-CSCF 304, which communicates with a corresponding originating S-CSCF 306. Without some form of bearer path shorting, the SBC 313 serves as the anchor point for all voice over LTE calls. For example, if end-user device 110a calls end-user device 110b, then the normal RTP path is UE1 110a to SBC 313 to UE2 110b. In one embodiment, re-routing the data communications via a shortest RTP bearer path avoids all calls being anchored at the SBC 313.

The originating S-CSCF 306 can submit the SIP INVITE message to one or more application servers 317 that can provide a variety of services to IMS subscribers. For example, the application servers 317 can be used for various functions including billing and/or network performance analysis. In one embodiment, the application servers 317 can be used to perform originating call feature treatment functions on the calling party number received by the originating S-CSCF 306 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services.

Additionally, the originating S-CSCF 306 can submit queries to the ENUM system 330 to translate an E.164 telephone number in the SIP INVITE message to a SIP Uniform Resource Identifier (URI) if the terminating communication device is IMS-compliant. The SIP URI can be used by an Interrogating CSCF (I-CSCF) 307 to submit a query to the HSS 340 to identify a terminating S-CSCF 314 associated with a terminating IMS CD such as reference 302. Once identified, the I-CSCF 307 can submit the SIP INVITE message to the terminating S-CSCF 314. The terminating S-CSCF 314 can then identify a terminating P-CSCF 316 associated with the terminating CD 302. The P-CSCF 316 may then signal the CD 302 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 3 may be interchangeable. It is further noted that communication system 300 can be adapted to support video conferencing. In addition, communication system 300 can be adapted to provide the IMS CDs 301, 302 with multimedia and Internet services.

If the terminating communication device is instead a PSTN CD such as CD 303 or CD 305 (in instances where the cellular phone only supports circuit-switched voice communications), the ENUM system 330 can respond with an unsuccessful address resolution which can cause the originating S-CSCF 306 to forward the call to the MGCF 320 via a Breakout Gateway Control Function (BGCF) 319. The MGCF 320 can then initiate the call to the terminating PSTN CD over the PSTN network 360 to enable the calling and called parties to engage in voice and/or data communications.

It is further appreciated that the CDs of FIG. 3 can operate as wireline or wireless devices. For example, the CDs of FIG. 3 can be communicatively coupled to a cellular base station 321, a femtocell, a WiFi router, a Digital Enhanced Cordless Telecommunications (DECT) base unit, or another suitable wireless access unit to establish communications with the IMS network 350 of FIG. 3. The cellular access base station 321 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 3.

Cellular phones supporting LTE can support packet-switched voice and packet-switched data communications and thus may operate as IMS-compliant mobile devices. In this embodiment, the cellular base station 321 may communicate directly with the IMS network 350 as shown by the arrow connecting the cellular base station 321 and the P-CSCF 316.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

Application servers 317 can be adapted to perform function 371 (e.g., via software executed at the application server) which can include subscribing to session events for selective reporting of ULI. As an example, the application server 317 can subscribe to the PCC (e.g., PCRF 180) which allows the application server 317 to selectively receive ULI based on events that are pertinent to the functions being performed by the application server without receiving unnecessary ULI for events that are not pertinent to the functions being performed by the AF. For instance, an application server 317 that is performing location-based service authorization can subscribe to session initiation events and session updates caused by user mobility while not subscribing to session terminations. In this example, the application server 317 can monitor the location of the UE based on the ULI to enforce authorization of location-based services in only a particular area. The subscribing function 371 performed by the application server 317 can result in distribution of the subscription information 345 to devices that are part of the ULI reporting process, such as HSS 155 or an MME (not shown).

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 4:
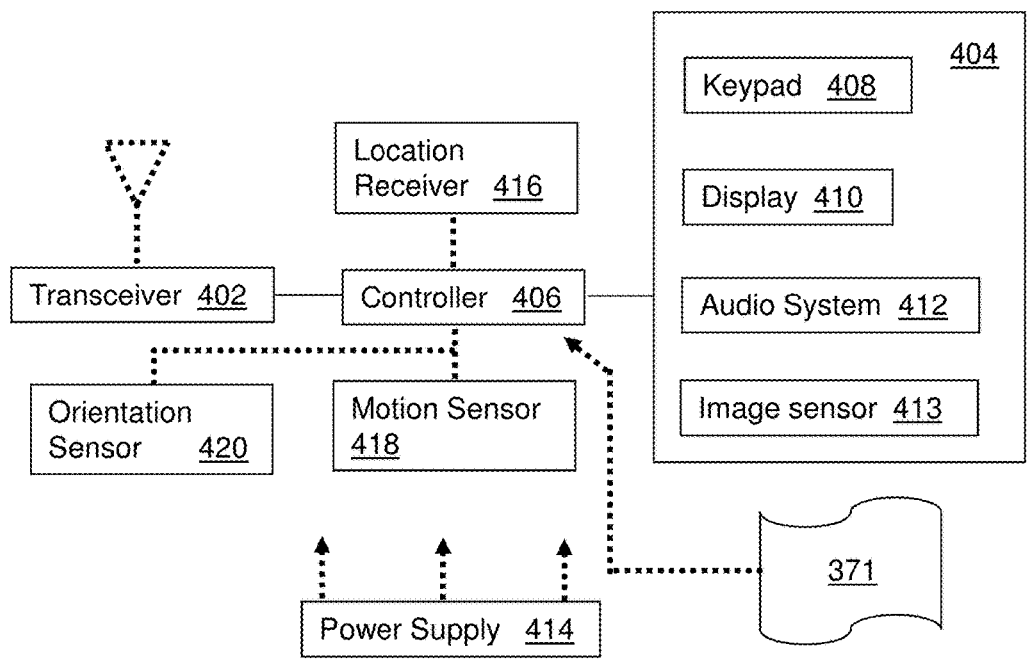
FIG. 4 depicts an illustrative embodiment of a communication device that can be used with a communication system for providing shortest bearer paths for carrying internet protocol packets during calling sessions.

FIG. 4 depicts an illustrative embodiment of a communication device that can be used in achieving improved network access via an anchored device. Communication device 400 can serve in whole or in part as an illustrative embodiment of the devices depicted in FIGS. 1 and 3, including application servers, PCEF devices, PCRF devices, UEs, HSS, MME and so forth. Device 400 can be a server that performs policy control and charging functions in a mobile communications network. Device 400 can receive subscriptions from a subset of application servers of a plurality of application servers, where the subscriptions identify session events of a communication session for which the subset of application servers request user location information, or a subset of the triggering events are subscribed. Device 400 can provide subscription information based on the subscriptions to core network nodes of the mobile communications network. Device 400 can receive user location information from the core network nodes responsive to detection of triggering events corresponding to the session events of the subscriptions. Device 400 can provide the user location information to an IP multimedia subsystem network for delivery to the subset of application servers without delivery to remaining application servers of the plurality of application servers that did not subscribe to the session events, or without delivering the ULI for undesired subsequent triggering events.

To enable selective reporting of ULI via a subscriber registration process, communication device 400 can comprise various components such as one or more of a wireline and/or wireless transceiver 402 (herein transceiver 402), a user interface (UI) 404, a power supply 414, a location receiver 416, a motion sensor 418, an orientation sensor 420, and a controller 406 for managing operations thereof. The transceiver 402 can support short-range or long-range wireless access technologies such as Bluetooth, ZigBee, WiFi, DECT, or cellular communication technologies, just to mention a few. Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 402 can also be adapted to support circuit-switched wireline access technologies (such as PSTN), packet-switched wireline access technologies (such as TCP/IP, VoIP, etc.), and combinations thereof.

The UI 404 can include a depressible or touch-sensitive keypad 408 with a navigation mechanism such as a roller ball, a joystick, a mouse, or a navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric keypad commonly used by phones, and/or a QWERTY keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display 410 with navigation features.

The display 410 can use touch screen technology to also serve as a user interface for detecting user input. As a touch screen display, the communication device 400 can be adapted to present a user interface with graphical user interface (GUI) elements that can be selected by a user with a touch of a finger. The touch screen display 410 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 410 can be an integral part of the housing assembly of the communication device 400 or an independent device communicatively coupled thereto by a tethered wireline interface (such as a cable) or a wireless interface.

The UI 404 can also include an audio system 412 that utilizes audio technology for conveying low volume audio (such as audio heard in proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and/or charging system technologies for supplying energy to the components of the communication device 400 to facilitate long-range or short-range portable applications. Alternatively, or in combination, the charging system can utilize external power sources such as DC power supplied over a physical interface such as a USB port or other suitable tethering technologies.

The location receiver 416 can utilize location technology such as a global positioning system (GPS) receiver capable of assisted GPS for identifying a location of the communication device 400 based on signals generated by a constellation of GPS satellites, which can be used for facilitating location services such as navigation. The motion sensor 418 can utilize motion sensing technology such as an accelerometer, a gyroscope, or other suitable motion sensing technology to detect motion of the communication device 400 in three-dimensional space. The orientation sensor 420 can utilize orientation sensing technology such as a magnetometer to detect the orientation of the communication device 400 (north, south, west, and east, as well as combined orientations in degrees, minutes, or other suitable orientation metrics).

The communication device 400 can use the transceiver 402 to also determine a proximity to a cellular, WiFi, Bluetooth, or other wireless access points by sensing techniques such as utilizing a received signal strength indicator (RSSI) and/or signal time of arrival (TOA) or time of flight (TOF) measurements. The controller 406 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 400.

Other components not shown in FIG. 4 can be used in one or more embodiments of the subject disclosure. For instance, the communication device 400 can include a reset button (not shown). The reset button can be used to reset the controller 406 of the communication device 400. In yet another embodiment, the communication device 400 can also include a factory default setting button positioned, for example, below a small hole in a housing assembly of the communication device 400 to force the communication device 400 to re-establish factory settings. In this embodiment, a user can use a protruding object such as a pen or paper clip tip to reach into the hole and depress the default setting button. The communication device 400 can also include a slot for adding or removing an identity module such as a Subscriber Identity Module (SIM) card. SIM cards can be used for identifying subscriber services, executing programs, storing subscriber data, and so forth.

The communication device 400 as described herein can operate with more or less of the circuit components shown in FIG. 4. These variant embodiments can be used in one or more embodiments of the subject disclosure.

The communication device 400 shown in FIG. 4 or portions thereof can serve as a representation of one or more of the devices of systems 100 and/or 300 of FIGS. 1 and 3. In addition, the controller 406 can be adapted in various embodiments to perform the functions 371 to enable a subscriber registration process that distributes subscription information so that ULI is selectively reported based on particular detected session events that are pertinent to the functions of the subscribing device, such as ULI being reported for session termination events to an application server performing network performance analysis.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 5:
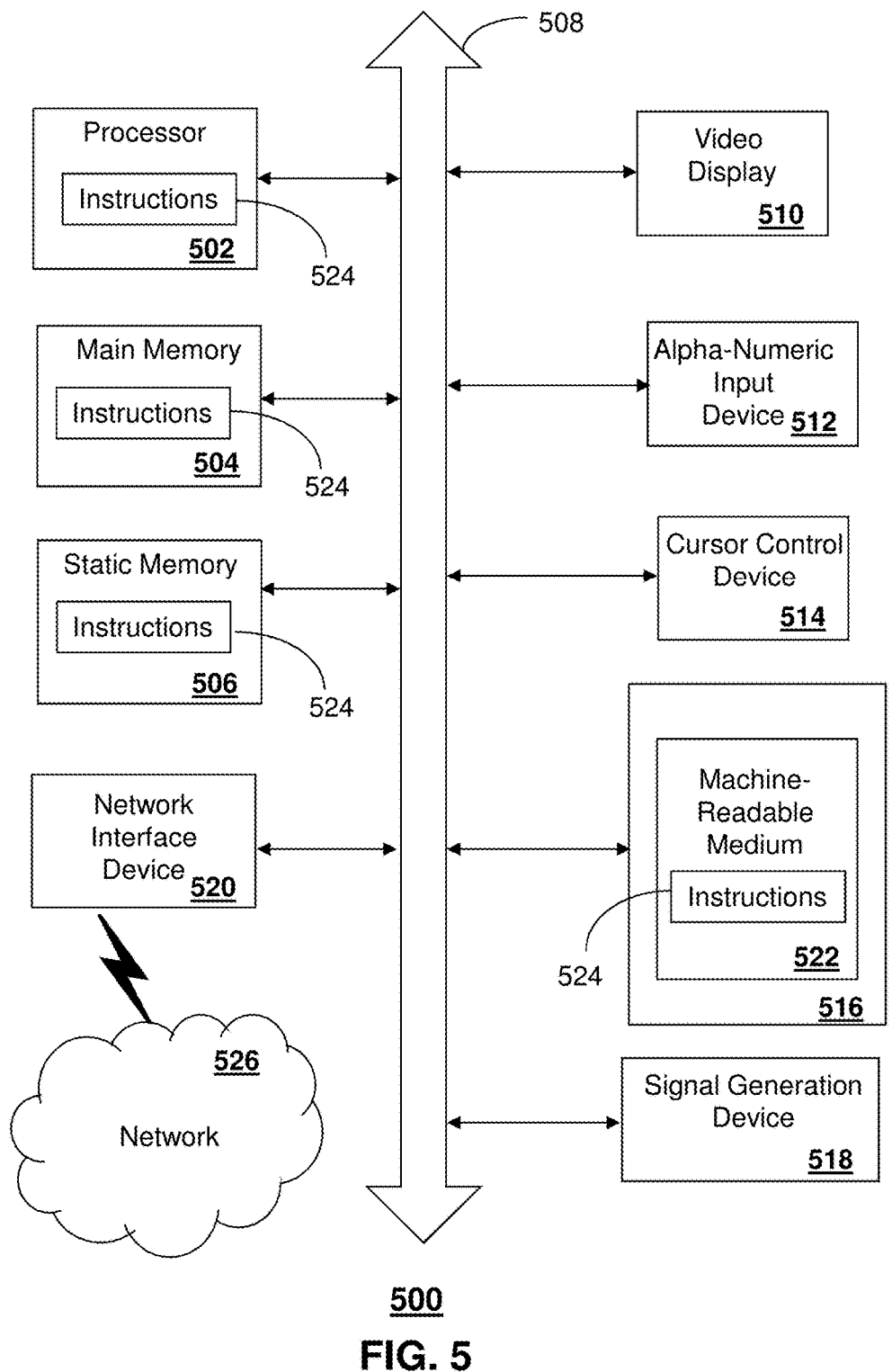
FIG. 5 is a diagrammatic representation of a machine in the form of a computer system within which a set of instructions, when executed, may cause the machine to perform any one or more of the methods described herein.

FIG. 5 depicts an exemplary diagrammatic representation of a machine in the form of a computer system 500 within which a set of instructions, when executed, may cause the machine to perform any one or more of the methods described above. One or more instances of the machine can operate, for example, as a PCC (e.g., the PCRF 180 and/or the PCEF 220), an MME, an HSS, an application server, a UE and other devices of FIGS. 1-2 and 5-6 to enable selective ULI reporting based on a subscription process. For example, the machine can receive a subscription from an application server, where the machine performs policy control and charging functions in a mobile communications network, and where the subscription identifies a session event occurring in a communication session for which the application server requests user location information. The machine can provide subscription information based on the subscription to core network nodes of the mobile communications network. The machine can receive user location information from the core network nodes responsive to a detection of a triggering event corresponding to the session event of the subscription. The machine can provide the user location information to an IP multimedia subsystem network for delivery to the application server, where the delivery of the user location information is limited to application servers that are subscribed to the session event, and/or only for the event/sub-event an application server has subscribed.

In some embodiments, the machine may be connected (e.g., using a network 526) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 500 may include a processor (or controller) 502 (e.g., a central processing unit (CPU), a graphics processing unit (GPU, or both), a main memory 504 and a static memory 506, which communicate with each other via a bus 508. The computer system 500 may further include a display unit 510 (e.g., a liquid crystal display (LCD), a flat panel, or a solid state display. The computer system 500 may include an input device 512 (e.g., a keyboard), a cursor control device 514 (e.g., a mouse), a disk drive unit 516, a signal generation device 518 (e.g., a speaker or remote control) and a network interface device 520. In distributed environments, the embodiments described in the subject disclosure can be adapted to utilize multiple display units 510 controlled by two or more computer systems 500. In this configuration, presentations described by the subject disclosure may in part be shown in a first of the display units 510, while the remaining portion is presented in a second of the display units 510.

The disk drive unit 516 may include a tangible computer-readable storage medium 522 on which is stored one or more sets of instructions (e.g., software 524) embodying any one or more of the methods or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 522 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 500.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

The exemplary embodiments described herein can be part of various communication systems including an Internet Protocol Television (IPTV) media system satellite and/or terrestrial communication systems. These systems can provide various services including voice video and/or data services. Multiple forms of media services can be offered to media devices (e.g., mobile communication devices, set top boxes, desk top computers, and so forth) over landline technologies. Additionally, media services can be offered to media devices by way of wireless technologies such as through use of a wireless access base station operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described). Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A device, comprising:
a processing system including a processor; and
a memory that stores executable instructions that, when executed by the processing system, facilitate performance of operations, comprising:
receiving a calling message indicating a calling session between a first mobile device and a second mobile device;
retrieving first network information associated with the first mobile device and second network information associated with the second mobile device according to the calling message;
identifying a first rate of movement of the first mobile device according to the first network information and identifying a second rate of movement of the second mobile device according to the second network information;
determining whether the calling session qualifies for shortening of a bearer path according to the first rate of movement of the first mobile device and the second rate of movement of the second mobile device being less than a threshold, wherein the shortening reduces a number of required elements in the bearer path;
comparing the first network information and the second network information to criteria for provisioning a target shortened bearer path resulting in a comparison;
determining that the first mobile device and the second mobile device are to remain in a same mobility management entity group according to the first rate of movement, the second rate of movement and the comparison; and
activating the target shortened bearer path for carrying internet protocol packets associated with the calling session.

2. The device of claim 1, wherein the operations comprise identifying the bearer path through a communication network for carrying internet protocol packets associated with the calling session according to the first network information and the second network information.

3. The device of claim 1, wherein the operations comprise identifying a base station communicatively coupled to both the first mobile device and second mobile device, and communicatively coupled to a cellular network.

4. The device of claim 1, wherein the operations comprise identifying a wireless local area network (LAN) access point communicatively coupled to both the first mobile device and second mobile device, and communicatively coupled to a wireless LAN.

5. The device of claim 1, wherein the operations comprise selecting a network element that is communicatively coupled to both the first mobile device and the second mobile device and that is closest to the first mobile device and the second mobile device to identify a nearest network element according to the calling session qualifying for bearer path shortening.

6. The device of claim 1, wherein a wireless LAN access point is selected as a network element in the targeted shortened bearer path based on the wireless LAN access point using less system resources than a base station for communication between the first mobile device and the second mobile device.

7. The device of claim 1, wherein the operations comprise determining if a nearest network element comprises a transcoder-free bridging bearer path.

8. The device of claim 1, wherein the operations comprise identifying that the first mobile device and the second mobile device have a common coder-decoder (CODEC).

9. The device of claim 8, wherein the activating of the target shortened bearer path comprises activating a transcoder-free target shortened bearer path responsive to identifying the common CODEC to generate a direct tunnel for carrying the internet protocol packets associated with the calling session and to modify the bearer path to the transcoder-free target shortened bearer path.

10. A non-transitory machine-readable storage medium, comprising executable instructions that, when executed by a processing system including a processor, facilitate performance of operations, comprising:
  obtaining a message indicating a communication session between a first mobile device and a second mobile device;
  receiving first network information associated with the first mobile device and second network information associated with the second mobile device according to the message;
  identifying a first rate of movement of the first mobile device according to the first network information and identifying a second rate of movement of the second mobile device according to the second network information;
  determining whether the communication session qualifies for shortening of a bearer path according to the first rate of movement of the first mobile device and the second rate of movement of the second mobile device being less than a threshold, wherein the shortening reduces a number of required elements in the bearer path;
  comparing the first network information and the second network information to criteria for provisioning a target shortened bearer path resulting in a comparison;
  determining that the first mobile device and the second mobile device are to remain in a same mobility management entity group according to the first rate of movement, the second rate of movement and the comparison;
  identifying that the first mobile device and the second mobile device have a common coder-decoder (CODEC); and
  activating the target shortened bearer path for carrying internet protocol packets associated with the communication session responsive to identifying the common CODEC to generate a direct tunnel for carrying the internet protocol packets associated with the communication session and to modify the bearer path to the target shortened bearer path.

11. The non-transitory machine-readable storage medium of claim 10, wherein the operations further comprise identifying the bearer path through a communication network for carrying internet protocol packets.

12. The non-transitory machine-readable storage medium of claim 10, wherein the operations comprise identifying a base station communicatively coupled to both the first mobile device and second mobile device, and communicatively coupled to a cellular network.

13. The non-transitory machine-readable storage medium of claim 10, wherein the operations comprise identifying a wireless local area network (LAN) access point communicatively coupled to both the first mobile device and second mobile device, and communicatively coupled to a wireless LAN.

14. The non-transitory machine-readable storage medium of claim 10, wherein the operations comprise selecting a network element that is communicatively coupled to both the first mobile device and the second mobile device and that is closest to the first mobile device and the second mobile device to identify a nearest network element according to the communication session qualifying for bearer path shortening.

15. The non-transitory machine-readable storage medium of claim 10, wherein a wireless LAN access point is selected as a network element based on the wireless LAN access point using less system resources than a base station for communication between the first mobile device and the second mobile device.

16. The non-transitory machine-readable storage medium of claim 10, determining if a nearest network element comprises a transcoder-free target shortened bearer path.

17. A method, comprising:
  receiving, by a processing system including a processor, a calling message indicating a calling session between a first mobile device and a second mobile device;
  retrieving, by the processing system, first network information associated with the first mobile device and second network information associated with the second mobile device according to the calling message;
  identifying, by the processing system, a first rate of movement of the first mobile device according to the first network information and identifying, by the processing system, a second rate of movement of the second mobile device according to the second network information;
  determining, by the processing system, whether the calling session qualifies for shortening of a bearer path according to the first rate of movement of the first mobile device and the second rate of movement of the second mobile device being less than a threshold, wherein the shortening reduces a number of required elements in the bearer path;

comparing, by the processing system, the first network information and the second network information to criteria for provisioning a target shortened bearer path resulting in a comparison;

determining, by the processing system, that the first mobile device and the second mobile device are to remain in a same mobility management entity group according to the first rate of movement, the second rate of movement and the comparison;

identifying, by the processing system, a wireless local area network (LAN) access point communicatively coupled to both the first mobile device and second mobile device, and communicatively coupled to a wireless LAN;

selecting, by the processing system, a network element that is communicatively coupled to both the first mobile device and the second mobile device and that is closest to the first mobile device and the second mobile device to identify a nearest network element according to the calling session qualifying for transcoder-free bearer path shortening, wherein the wireless LAN access point is selected as the network element based on the wireless LAN access point using less system resources than a base station for communication between the first mobile device and the second mobile device; and activating, by the processing system, the target shortened bearer path for carrying internet protocol packets associated with the calling session.

18. The method of claim 17, comprising identifying, by the processing system, the bearer path through a communication network for carrying internet protocol packets.

19. The method of claim 17, comprising identifying, by the processing system, that the first mobile device and the second mobile device have a common coder-decoder (CODEC).

20. The method of claim 19, wherein the activating of the target shortened bearer path comprises activating, by the processing system, a transcoder-free target shortened bearer path responsive to identifying the common CODEC to generate a direct tunnel for carrying the internet protocol packets associated with the calling session and to modify the bearer path to the transcoder-free target shortened bearer path.

* * * * *